United States Patent [19]

Maeda et al.

[11] Patent Number: 4,536,455
[45] Date of Patent: Aug. 20, 1985

[54] CENTRIFUGALLY CAST DOUBLE-LAYER TUBE WITH RESISTANCE TO CARBON DEPOSITION

[75] Inventors: Keikichi Maeda; Takahiro Iijima, both of Yokohama; Eiichi Sato, Atsugi, all of Japan

[73] Assignees: JGC Corporation, Tokyo; Taihei Kinzoku Kogyo Co., Ltd., Yamato, both of Japan

[21] Appl. No.: 517,292

[22] Filed: Jul. 26, 1983

[30] Foreign Application Priority Data

Jul. 26, 1982 [JP] Japan .................................. 57-129980

[51] Int. Cl.³ ............................................ B32B 15/00
[52] U.S. Cl. .................................... 428/629; 428/656;
428/678; 428/680; 428/682; 428/683; 428/685;
428/679; 138/143
[58] Field of Search ............... 428/629, 656, 678, 679,
428/680, 682, 683, 685; 138/143, 145; 75/124
E, 124 F

[56] References Cited

U.S. PATENT DOCUMENTS

| | | | |
|---|---|---|---|
| 4,022,587 | 5/1977 | Wlodek | 428/656 |
| 4,054,723 | 10/1977 | Higginbothan et al. | 428/680 |
| 4,101,715 | 7/1978 | Rairden, III | 428/680 |
| 4,117,179 | 9/1978 | Jackson | 428/653 |
| 4,357,394 | 11/1982 | Khandros | 138/143 |
| 4,429,019 | 1/1984 | Schrewelius | 428/680 |

OTHER PUBLICATIONS

Chemistry and Physics of Carbon, (P. L. Walker, Jr., ed.), vol. 1, pp. 265 and 311-316, (1965), M. Dekker, New York.
"1983 Annual Book of ASTM Standards", vol. 03.02, title page and pp. 134, 136 and 471, (1983), ASTM, Philadelphia.
"Journal of Catalysis", 33, pp. 98 and 100, (1974).
"Werkstoffe und Korrosion" 28, pp. 1 and 3, (1977).
"Corrosion" (L. L. Shreir, ed.), vol. 1, title pages and 1.3-1.15, (1963), George Newnes Limited, London.

Primary Examiner—Melvyn J. Andrews
Assistant Examiner—Deborah Yee
Attorney, Agent, or Firm—Flynn, Thiel, Boutell & Tanis

[57] ABSTRACT

A centrifugally cast double-layer tube with resistance to carbon deposition, comprising an inner layer of a specific metallic material containing 1-10 wt % of Al and an outer layer of a heat resisting metallic material, can be applied to apparatuses for treating a fluid, containing hydrocarbons, their derivatives, or carbon monoxide, at elevated temperatures and to piping for transferring the fluid without carbon deposition on its inside surface, because the surface of said inner layer is oxidized to form a firm Al-containing oxide film prior to and/or during the treatment of the fluid, and also a sufficient strength and ductility of the tube are preserved by the support of the outer layer of said tube.

7 Claims, 9 Drawing Figures

FIG. 1

CENTRIFUGALLY CAST DOUBLE-LAYER TUBE

FIG. 2

TUBE SUBJECTED TO 950°C x 30MIN ATMOSPHERIC OXIDATION

DYE PENETRATION EXAMINATION RESULTS OF TEST
SPECIMENS AFTER BENDING TEST

FIG. 3A
HK-40 TUBE

FIG. 3C
DOUBLE-LAYER TUBE

FIG. 3B
AL-CONTAINING TUBE

FIG. 4

DYE PENETRATION EXAMINATION RESULTS OF TEST SPECIMEN AFTER FLATTENING TEST

FIG. 5

DYE PENETRATION EXAMINATION RESULTS OF TEST SPECIMENS
AFTER 70-TIMES REPETITION OF THERMAL SHOCK TEST
(1050°C x 30 MIN → WATER COOLING)

APPEARANCE OF THE SPECIMENS WITH CARBON
DEPOSIT FORMED ON THE SECTION OF DOUBLE-
LAYER TUBE

FIG. 6A
DOUBLE-LAYER TUBE A
(OUTER LAYER: HK-40,
INNER LAYER: 22%Cr-30%Ni-7%AL

FIG. 6B
DOUBLE-LAYER TUBE B
(OUTER LAYER: Ni-20%Cr,
INNER LAYER: Ni-20%Cr-5%AL)

CENTRIFUGALLY CAST DOUBLE-LAYER TUBE WITH RESISTANCE TO CARBON DEPOSITION

BACKGROUND OF THE INVENTION (a) Field of the Invention

The present invention relates to a centrifugally cast double-layer tube which is capable of preventing or mitigating the carbon deposition caused when hydrocarbons or their derivatives are thermally cracked in the presence or absence of steam as seen in ethylene producing apparatus, delayed coking apparatus and the like or when a fluid containing carbon monoxide is treated at elevated temperatures as seen in synthetic gas producing apparatus, which tube also possesses sufficient strength and ductility.

(b) Description of the Prior Art

The tubes used in the above mentioned processes for treating a fluid containing hydrocarbons, their derivatives or carbon monoxide at elevated temperatures, have usually been made of austenitic steels, ferritic steels, austenite.ferrite duplex-phase steels, low-alloy steels and the like. However, these tubes have been defective in that carbon deposition is liable to occur on the surface in contact with the high temperature fluid during the operation, frequently producing various operational evils such as arise in $\Delta p$, lowering in heating efficiency and the like, thereby making it necessary to perform so-called decoking very frequently. It could be said that this impedes the steady running of the apparatus and further acts not only to exert various disadvantages upon the material constituting the apparatus but also aggravates the economy of the process.

In order to prevent the carbon deposition in this apparatus, various investigations have usually been made. For instance, it is reported in "Ind Eng. Chem. Proc.—Design and Development. 8[1](1969) 25 by B. L. Crynes, L. F. Albright" that the carbon deposition in the ethylene producing apparatus can be somewhat suppressed by adding a very small amount of $H_2S$ to the feed and some processes presently employ this. However the fact is that since the inside of the cracking tube used in the ethylene producing apparatus or the like, is under a very oxidized atmosphere, the effect of the $H_2S$ was not so great.

Actually, the inner surface of the tube used in the above mentioned apparatus, to which the present invention pertains, is covered with scales. According to the report of Lobo and others (Preprint for the 5th International Congress on Catalysis, Amsterdam (1972)), it is concluded that carbon deposition is caused by the transition metal elements contained in the construction material of the tube member, such as Fe, Ni and the like, and the said deposition is continued because by the atoms of these elements ceaselessly appear, as if floating, on the upper surface of the carbon deposit layer.

Since it is actually proved by the inventors' investigation that when analyzing the coke deposited on the inner surface of the tube member of the apparatus, the transition metal elements such as Fe, Ni and the like can be detected, it is conjectured that carbon deposition is attributable to the supply of transition metal elements such as Fe, Ni and the like caused by reduction of the oxide containing Fe, Ni and the like as its construction elements on the inner surface of the tube, or brought about by the diffusion of transition metal elements through the surface oxide film from the interior of the tube wall.

SUMMARY OF THE INVENTION

The present invention provides a tube member of an apparatus for treating a fluid containing hydrocarbons or their derivatives or carbon monoxide at elevated temperatures and piping for transferring these fluids, being capable of preventing or exceedingly reducing carbon deposition while simultaneously possessing sufficient strength and ductility.

In other words, the present invention relates to a centrifugally cast double-layer tube which comprises an inner layer of a specific metallic material containing 1–10 wt % of Al and an outer layer of a heat-resisting metallic material.

DETAILED DESCRIPTION OF THE INVENTION

The present invention employs a specific metallic material containing 1–10 wt % Al, the base metal of which is selected from austenitic steels, ferritic steels, austenite. ferrite duplex-phase steels, low-alloy steels, Ni alloys, Ni-Cr alloys, Co alloys, Co-Cr alloys or the like, for the inner layer of the tube, being capable of preventing or mitigating carbon deposition on the inner surface of the tube. In case the Al content in these metallic materials is less than 1% by weight, no oxide film can be formed which is capable of preventing carbon deposition. However when the Al content is more than 10% by weight, the castability, weldability and further machinability become inferior. From the viewpoints of oxide film stability and tube machinability, it is preferable, in practice, that the Al content should be in the range of 4–8% by weight. In order to stabilize the film more firmly, a small amount of Ti, Nb, Zn, or rare-earth elements such as Ce, Y or the like can be optionally added.

It is possible to choose an outer layer material of any heat resisting alloys such as 25% Cr—20% Ni HK—40(JIS SCH 22) i.e. 25% Cr—20% Ni, HP (JIS SCH 24) i.e. 25% Cr—35% Ni, or IN519 i.e. 24% Cr—24% Ni—1.5% Nb or Ni-Cr alloys, Co-Cr alloys or their modifications.

According to the present invention, the outer and inner layers are formed by centrifugal casting.

Figure 1:
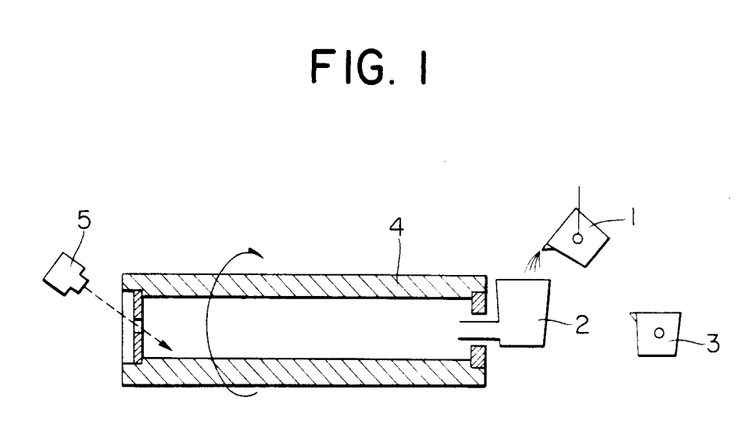
FIG. 1 is a explanatory schematic view illustrating the steps of producing a centrifugally cast double-layer tube according to the present invention.

The concrete process for producing the double-layer tube according to the present invention will be explained according to FIG. 1 as follows.

An outer layer-forming molten metal is tapped into the ladle 1, and the ladle 1 is placed at the runner pot 2, located just in front of the centrifugal casting machine 4, in the course of the step the molten metal temperature is maintained at 1450°–1600° C. At about the same time, an inner layer-forming molten metal containing a fixed amount of Al is tapped into ladle 3, and ladle 3 is placed near ladle 1, in the course of the step the molten metal temperature is maintained at 1500°–1650° C.

Then, the outer layer-forming molten metal is poured from ladle 1 through runner pot 2 into the centrifugal casting machine 4. Simultaneously, the surface temperature of the outer layer-forming molten metal is started to be measured by the infrared thermometer 5. When the temperature becomes lower than the liquidus of the outer layer-forming metal (about 1395° C. for HK-40), the inner layer-forming molten metal is started to be poured from ladle 3 through runner pot into the centrifugal casting machine 4. A double-layer tube according to the present invention, which has an its inner surface a layer capable of preventing carbon deposition, can be produced under almost exactly the same conditions as those employed when manufacturing usual centrifugally cast tubes, examples of the conditions are, the number of rotations of the centrifugal casting machine (which is substantially in the range of 500–2000 rpm, although variable depending on the tube diameters), the metal mold temperature (300°–400° C.) and the like, which are maintained through the whole process.

The thickness of the outer layer and inner layer is determined by the amount of molten metal to be poured respectively, which is designed beforehand in each case. The thickness of each layer can be suitably determined in accordance with the apparatus to which the tube is applied with the working conditions without any limitations.

As mentioned above, the tube according to the present invention is characterized by being composed of inner and outer layers which have been formed by the centrifugal casting method. In the case of the tube comprised only of the inner layer material, namely the metallic material containing 1–10% by weight of Al, its tensile strength increases but its ductility decreases at ambient temperatures, in other words the tube becomes brittle. At elevated temperatures, on the other hand, its creep rupture ductility is sufficient but its creep strength becomes inferior. The problem of a decrease in mechanical properties of the Al-containing material has been resolved by the present invention by providing a double-layer tube in which the Al-containing inner layer and the outer layer made of usual casting material are combined together firmly by the centrifugal casting method.

The mechanical properties and creep rupture properties of an example of Al-containing inner layer material and a typical heat-resisting cast steel are shown in Table 1 and Table 2 respectively.

TABLE 1

| Materials | Chemical compositions (wt %) | | | | | | Mechanical properties | | | | |
|---|---|---|---|---|---|---|---|---|---|---|---|
| | C | Si | Mn | Ni | Cr | Al | 0.2% proof stress (kg/mm²) | Tensile strength (kg/mm²) | Elongation (%) | Reduction of area (%) | Vickers hardness Hv (10 kg) |
| HK-40 | 0.41 | 1.00 | 0.89 | 22.27 | 23.63 | — | 34.7 | 58.6 | 33.9 | 23.7 | 189 |
| | | | | | | | 36.6 | 57.8 | 22.6 | 21.4 | |
| HK-40 + 4% Al | 0.45 | 1.00 | 0.88 | 20.00 | 25.93 | 4.03 | 68.0 | 81.1 | 8.4 | 8.2 | 264 |
| | | | | | | | 66.9 | 78.6 | 7.7 | 6.9 | |
| HK-40 + 5% Al | 0.52 | 1.01 | 0.46 | 19.93 | 25.86 | 5.14 | — | 83.6 | 0.1 | 0.0 | 428 |
| | | | | | | | — | 93.6 | 0.1 | 0.0 | |
| 22Cr—30Ni + 4% Al | 0.21 | 1.26 | 1.25 | 30.70 | 22.05 | 4.22 | 63.0 | 68.0 | 4.9 | 2.9 | 285 |

TABLE 2

| | Test conditions | | Test results | |
|---|---|---|---|---|
| Materials | Temperature (°C.) | Stress (kg/mm²) | Time to Rupture (hr) | Elongation (%) |
| HK-40 | 955 | 2.7 | 418 | 5.2 |
| | 1050 | 1.3 | 604 | 4.0 |
| 22Cr—30Ni + 4% Al | 950 | 2.7 | 137 | 26.2 |
| | 1050 | 1.32 | 119 | 23.0 |

It is understood from Table 1 and Table 2 that the mechanical properties (ductility at an ambient temperature) and creep rupture properties of the inner layer material become inferior by making said material contain Al, but that the inferiority in these properties can be countered by the outer layer made of a conventional heat resisting cast steel. Furthermore, according to the present invention, the double-layer tube has the advantage of eliminating the risk of disbonding between the two layers, because the inner and outer layers are combined together metallurgically by centrifugal casting and consequently their interface is fused enough to have sufficient mechanical strength. In addition, since the surface of the inner layer can be easily machined and further welding of double-layer tubes in addition to welding double-layer tube and a usual tube can be performed with good results by using the Al-alloyed filler wire, HK-40 filler wire and the like, the double-layer tube of the present invention can be applied to the apparatuses without any trouble.

The manner of forming an Al-containing oxide film on the surface of the inner layer of the centrifugally cast double-layer tube varies according to the process to which the said tube is applied. That is, in the case of the cracking tube of the ethylene producing process or the reactor tube of the dehydrogenation of ethylbenezene wherein steam is contained as a dilution medium and/or a thermal medium, an oxidizing atmosphere is obtained at the treatment or reaction temperature, because the fluid to be treated in itself is oxidizing and therefore the inside surface of the tube is naturally oxidized from the beginning of the treatment or reaction of the fluid without any pre-oxidation of the tube, whereby forming a dense Al containing film. In case the fluid to be treated in itself has no or little ability to oxidize the inner layer material, a certain measure should taken to let an Al-containing oxide film or on the surface of the tube, which comprises oxidizing the surface of the inner layer beforehand by the use of a suitable step before the fluid to be treated is introduced to the process system, or allowing a proper amount of oxidizing fluid to flow prior to the start of treatment or reaction.

For the apparatuses to which the centrifugally cast double-layer tube of the present invention is suitably applicable, there can be enumerated: the so-called ethylene producing apparatus aiming at the production of light unsaturated hydrocarbons such as ethylene and the like which comprises passing naphtha, ethane, gas oil or the like through the cracking tube provided in the heating furnace together with steam at 750°–900° C. (fluid temperature); the piping system of the delayed coking apparatus which comprises preheating the vacuum distillation residue and the like within the heating tube and coking them within the coking drum; the apparatus of producing styrene which comprises dehydrogenating ethylbenzene under the existance of steam at an elevated temperatures; the apparatus of dealkylating alkylbenzenes; and the apparatus of producing synthetic gases which comprises adding steam (in the case of partial oxidation process, oxygen is added to the feed hydrocarbons (methane, LPG, naphtha and the like) and heating them to produce carbon monoxide and hydrogen, namely those apparatuses which are used in treating a fluid containing hydrocarbons or their derivatives or carbon monoxide and include the parts exposed to elevated temperatures such as heating furnaces (cracking furnace, reactor furnace, preheating furnace), transfer line, fractionator, heat exchanger and the like where carbon deposition (including the so-called "fouling", i.e. the agglomeration of carbonaceous substances especially caused in heat-exchangers) has usually been a problem.

The centrifugally cast double-layer tube according to the present invention is thus applicable as a tube member for use in various apparatuses wherein carbon deposition has usually been a problem. In the present invention, an Al-containing oxide film is formed on the surface of the inner layer. This film is dense and firm in addition to being physically and chemically stable. Accordingly, various transition metals, which give rise to carbon deposition and are present in the inner layer material as well as the outer layer material, are covered by the oxide film and are prevented from diffusion upwards to the outer surface through the film, which leads to carbon deposition prevention or reduction by making use of the double-layer tube, which is also superior in mechanical properties, weldability and the like.

Accordingly, the present invention dispenses with the periodical decoking operations and ensures the continuous running, whereby the products are stabilized in quality. Furthermore according to the present invention, superfluous equipment and utilities required for decoking can be omitted, and so it can be expected that the cost of equipment would be reduced largely and the cost of decoking would also be reduced. Still further, the present invention does not cause a rise in the Δp and ensures stable operation. In addition, the heating furnace and the like are free from the heat insulating effect caused by the deposited carbon on the inner surface of the tube so that the fluid can be kept heated without any gradual rise in the temperature of the outer surface of the tube. Due to this fact, the fuel is economized, the temperature exerted on the tube material is lowered resulting in an expected prolongation of tube life.

The examples of the present invention will be given hereinafter.

Example 1

A double-layer tube comprising an inner layer and an outer layer was made by centrifugal casting, said inner and outer layers having chemical compositions as shown in Table 3. The conditions of casting are as follows. The aperture of the metal mold used was 102 mm $\phi$, the preheating temperature of the mold was 350° C., and the number of rotations of the mold was 1200 rpm. The temperatures for casting the outer layer and the inner layer were 1580° C. and 1600° C. respectively, and at the time the temperature of the surface of the outer layer reached 1350° C., after the completion of casting the outer layer, the inner layer forming molten metal was poured.

TABLE 3

| Materials | | Chemical compositions (wt %) | | | | | | | |
|---|---|---|---|---|---|---|---|---|---|
| | | C | Si | Mn | Cr | Ni | Mo | Ti | Al |
| Outer layer | HK-40 | 0.40 | 0.86 | 0.60 | 24.76 | 21.89 | 0.12 | — | — |
| Inner layer | 20Cr—30Ni—7Al | 0.26 | 1.04 | 1.16 | 19.24 | 29.85 | 0.03 | 0.81 | 6.69 |

Figure 2:
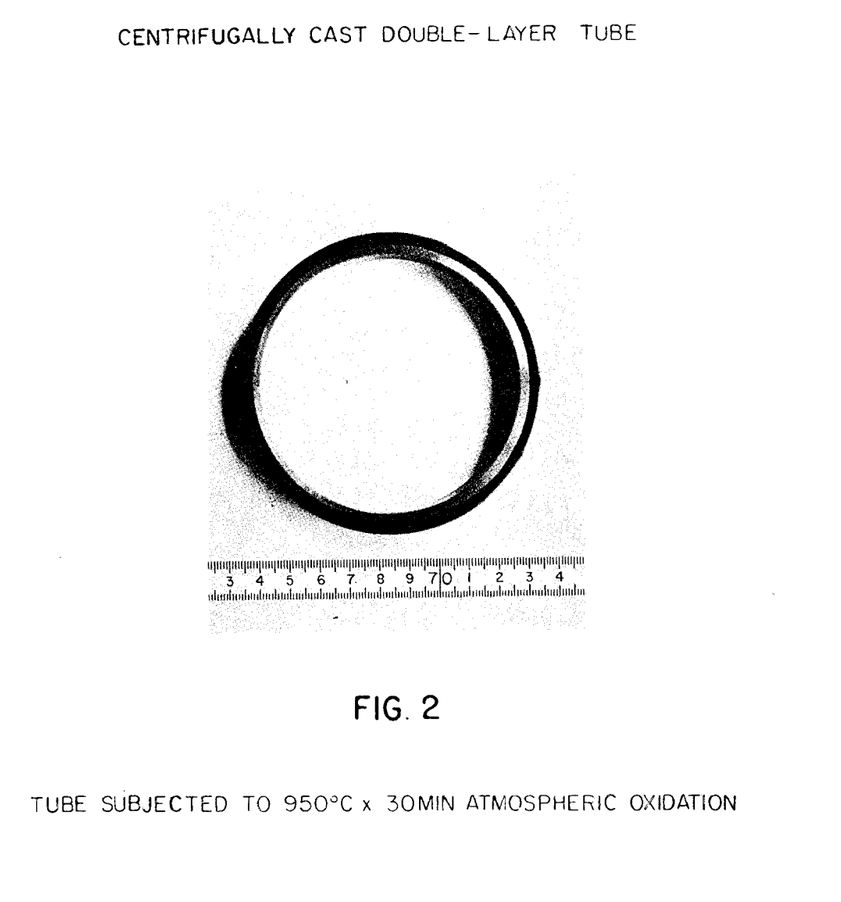
FIG. 2 is a photographic view illustrating a section of the centrifugally cast double-layer tube of Example 1.

Referring to the dimensions of the thus obtained centrifugally cast double-layer tube, the outer diameter was 99.8 mm $\phi$, the thickness of the outer layer was 4.5 mm, the thickness of the inner layer was 3.0 mm (after machining the inner surface to a depth of 2.5 mm), and the total length of the tube was 2000 mm. The appearance of the section thereof is shown in FIG. 2. In order to check the soundness of bonding regarding the two layers of this tube, the following were performed (1) a bending test and a flattening test, and (2) a thermal shock test. For the purpose of further comparison, a tube comprising only the HK-40 used for the outer layer and a tube comprising only the 20% Cr—30% Ni—7% Al cast steel (which will be called Al-containing tube for short), were prepared and these tubes were subjected to the same tests.

(1) Bending test and flattening test

Figure 3A:
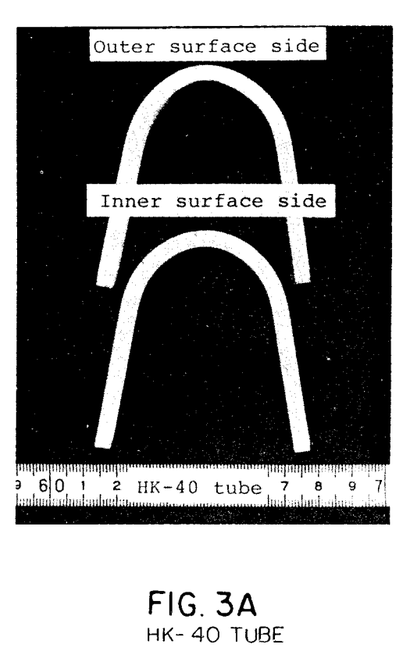
FIGS. 3(a), 3(b) and 3(c) are photographic views illustrating the dye check results of test specimens after they have been subjected to a bending test in Example 1.
Figure 3B:
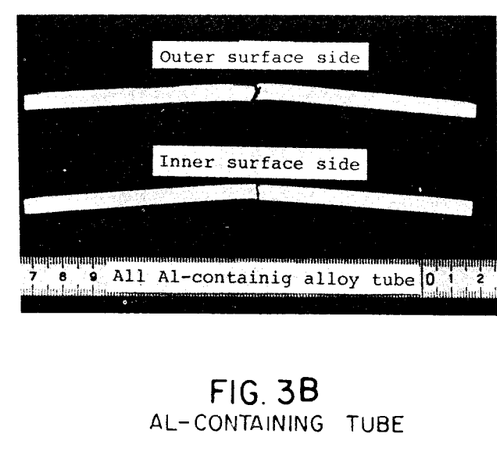
Figure 3C:
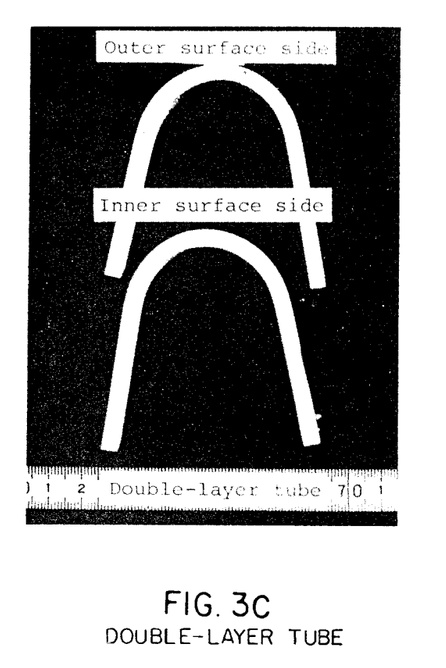

The dye penetration examination results of the side faces of the respective test specimens after they have been subjected to a bending test are shown in FIG. 3, wherein (a) shows the test specimens of the HK-40 tube, (b) shows the test specimens of the Al-containing tube and (c) shows the test specimens of the double layer tube, prepared so that their side face is composed of the inner layer and the outer layer in the ratio of 1:1 in thickness. The dimensions of the test specimens are 5×20×150 (mm), and the bending radius thereof is 19 mm.

It was found from the test results that the Al-containing tube had scarcely been bent before it broke, but the double-layer tube as well as the HK-40 tube could be bent fully. Further, the interface of the double-layer tube was found to be sound and assured to have sufficient strength.

Figure 4:
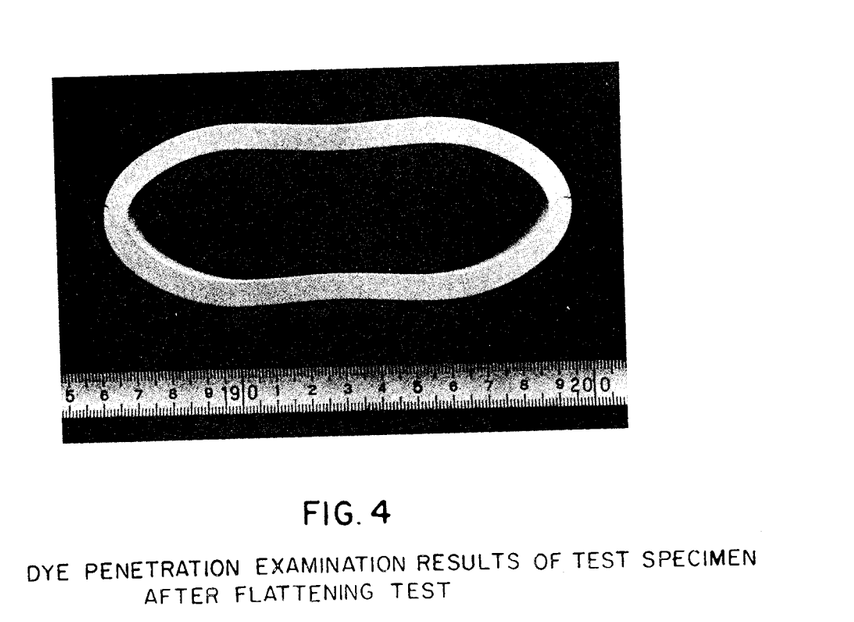
FIG. 4 is a photographic view illustrating the dye check result of a test tube after it has been subjected to a flattening test in Example 1.

The dye penetration examination result of the test specimen of the double-layer tube after it has been subjected to a flattening test is shown in FIG. 4. Referring to the dimensions of the test specimen, the outer diameter is 99.8 mmφ, the total thickness is 8 mm (the thickness of the outer layer is 4.5 mm and the thickness of the inner layer is 3.5 mm) and the width is 60 mm.

The test results showed that cracks were generated from the outer surface (HK-40) but the interface of the layers was still sound, which means that bonding of the layers is sufficiently resistant to mechanical loads.

(2) Thermal shock test

Ring type specimens were prepared for the test. The dimensions of said specimens are as follows: outer diameter 136 mm φ, thickness 6.6 mm (thickness of each of the inner and outer layers is 3.3 mm for the double-layer tube and height 25 mm and all surfaces are machine-finished in the order of 12.5 S ($\overline{\nabla\nabla\nabla}$). These ring specimens were subjected to a repeated thermal shock test (1050° C. ×30 minutes→water-cooled). The results are shown in Table 4.

TABLE 4

| Kind of tube | Results |
|---|---|
| Double-layer tube | Neither crack nor disbonding could be observed after said thermal shock test has been repeated 70 times. |
| Single-wall tube (HK-40) | A number of cracks were observed on the inner surface after said thermal shock test has been repeated 30 to 40 times. |

Figure 5:
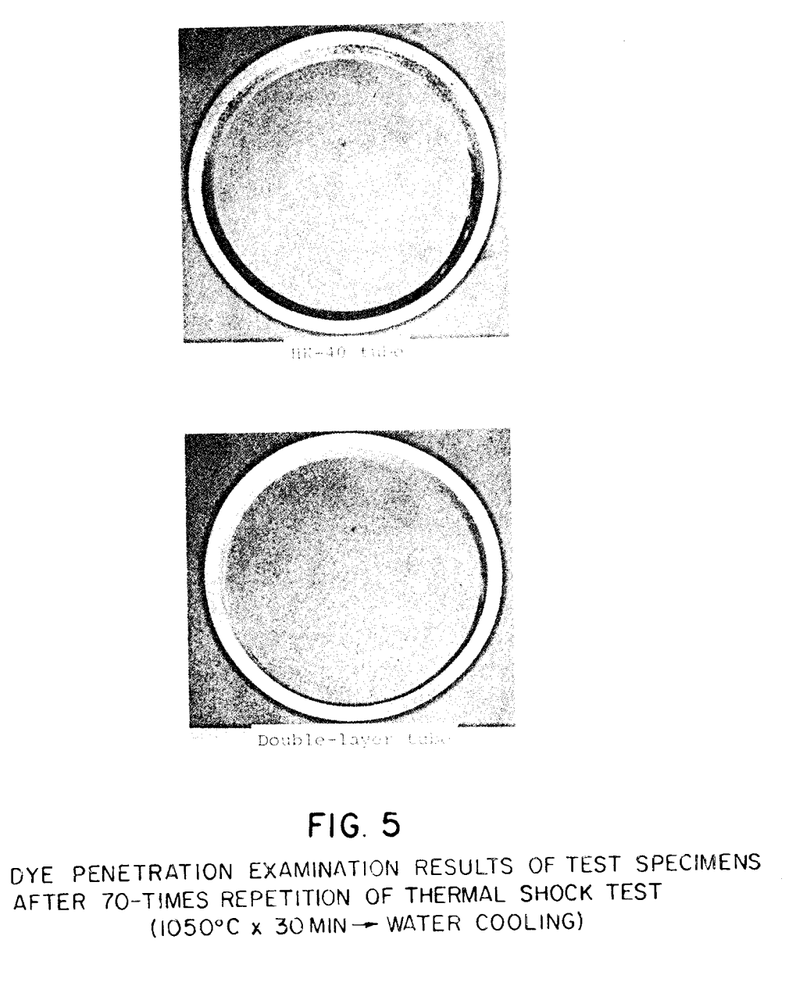
FIG. 5 is a photographic view illustrating the dye check results of test specimens after they have been subjected to a thermal shock test of 70 cycles in Example 1.

The dye penetration examination results of the test specimens after having been subjected to thermal shock test 70 times are shown in FIG. 5.

It was assured from the above results that the double-layer tube was superior in thermal shock resistance, which in addition means that bonding of the layers is sufficiently resistant to thermal effect.

EXAMPLE 2

Figure 6A:
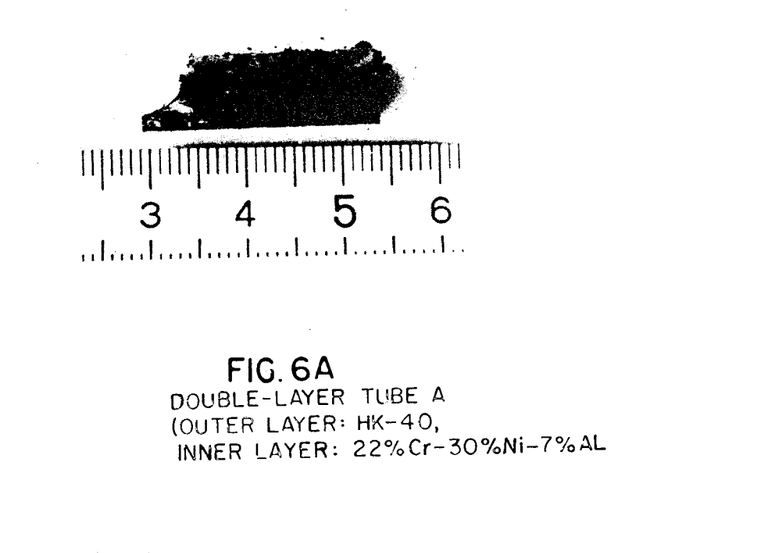
FIGS. 6(a) and 6(b) are photographic view illustrating the appearance of the specimens with a carbon deposit after they have been subjected to a coking test in Example 2.
Figure 6B:
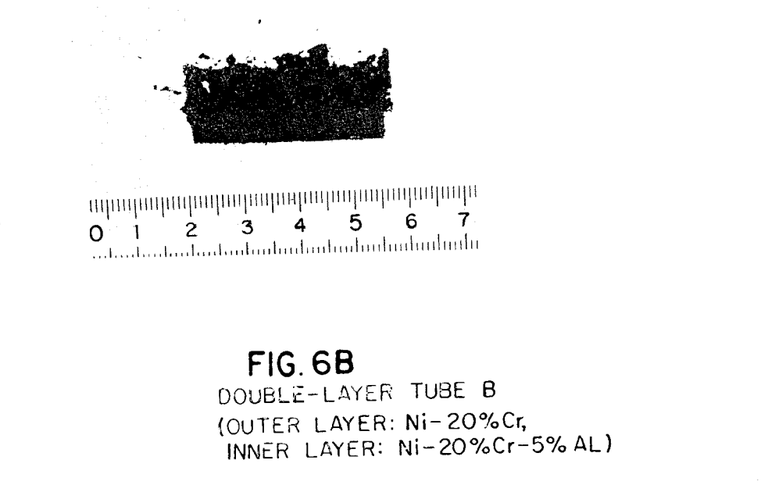

Test specimens were prepared from a double-layer tube A (outer layer HK-40 and inner layer 22% Cr—30% Ni—7% Al) produced in the same way as Example 1 and a double-layer tube B (outer layer Ni—20% Cr and inner layer Ni—20% Cr—5% Al) produced likewise. These test specimens were surface—finished with #120 emery paper, oxidized at 1100° C. for/hour in the atmosphere and thereafter subjected to a coking test. This test was performed by placing the double layer specimens one by one in the reaction tube (made of quartz) of the coking test device, and supplying a feed gas and a carrier gas through one end of said reaction tube under the conditions given below, with the reacted gasses being exhausted through the other end of the reaction tube. The appearance of the specimens with carbon deposit after said test is shown in FIG. 6.

Feed gas, benzene: 0.45 g/hr.
Carrier gas, argon: 18 Nml/min.
Temperature, 800° C.
Duration of test, 3 hours It was assured from the above results that carbon deposition occurred only at the part of the outer layer but not at the part of the inner layer, which means that the Al-containing inner layer is sufficiently resistant to carbon deposition.

What is claimed is:

1. A centrifugally cast double-layer tube which exhibits improved resistance to carbon deposition on the inner surface thereof caused by treating a fluid containing hydrocarbons, derivatives of hydrocarbons or carbon monoxide at an elevated temperature within said tube, said tube comprising an outer annular layer of a first, heat-resistant metal and an inner annular layer bonded directly to said outer layer, said inner layer being made of a second metal containing from 1 to 10 wt. % of aluminum and the balance is selected from the group consisting of austenitic steel, ferritic steel, austenite-ferrite duplex-phase steel, low-alloy steel, Ni alloy, Ni-Cr alloy, Co alloy and Co-Cr alloy.

2. A centrifugally cast double-layer tube as claimed in claim 1, which has been prepared by pouring said first metal, in a molten state, into a rotating centrifugal casting mold to form it into said outer annular layer and allowing it to cool below its liquidus temperature while rotating the mold, and then, while continuing to rotate the mold, pouring said second metal, in a molten state, into the rotating mold so that said second metal directly contacts the inner surface of said outer annular layer and forms said inner annular layer thereon and then allowing said inner layer to solidify while rotating the mold.

3. A centrifugally cast double-layer tube as claimed in claim 2 in which the inner surface of said inner layer has a dense, firm, stable, aluminum-containing oxide film thereon.

4. A centrifugally cast double-layer tube as claimed in claim 1, claim 2 or claim 3 in which said second metal contains from 4 to 8 wt. % of aluminum.

5. A centrifugally cast double-layer tube as claimed in claim 1, claim 2 or claim 3 in which said first metal is selected from the group consisting of heat-resistant steel, heat-resistant Ni-Cr alloy and heat-resistant Co-Cr alloy.

6. A tube as claimed in claim 1, wherein said second metal consists essentially of 0.21–0.52 wt. % C, 1.00–1.26 wt. % Si, 0.46–1.25 wt. % Mn, 19.93–30.70 wt. % Ni, 22.05–25,93 wt. % Cr, 4.03–5.14 wt. % Al, and the balance is essentially iron.

7. A centrifugally cast tube which is resistant to carbon deposition on the inner surface thereof in the presence of thermally cracked hydrocarbons or derivatives thereof or in the presence of a fluid containing carbon monoxide which has been treated at an elevated temperature, said tube consisting essentially of an outer annular layer consisting essentially of a first, heat-resistant metal selected from the group consisting of steel, Ni-Cr steel alloy and Co-Cr steel alloy, an inner annular layer made of a second metal containing 1 to 10 wt. % aluminum and the balance is selected from the group consisting of austenite-ferrite duplex-phase steel, low-alloy steel, Ni steel alloy, Ni-Cr steel alloy, Co steel alloy, and Co-Cr steel alloy, and a dense, firm, stable aluminum-containing oxide film covering the inner surface of said inner layer.

* * * * *